United States Patent
Lovell et al.

(10) Patent No.: US 12,001,262 B2
(45) Date of Patent: Jun. 4, 2024

(54) SYSTEMS AND METHODS FOR PERFORMING IN-FLIGHT COMPUTATIONS

(71) Applicant: Maxim Integrated Products, Inc., San Jose, CA (US)

(72) Inventors: Mark Alan Lovell, Lucas, TX (US); Robert Michael Muchsel, Addison, TX (US)

(73) Assignee: MAXIM INTEGRATED PRODUCTS, INC., San Jose, CA (US)

( * ) Notice: Subject to any disclaimer, the term of this patent is extended or adjusted under 35 U.S.C. 154(b) by 228 days.

(21) Appl. No.: 17/330,022

(22) Filed: May 25, 2021

(65) Prior Publication Data

US 2022/0382361 A1 Dec. 1, 2022

(51) Int. Cl.
| G06F 1/26 | (2006.01) |
| G06F 1/32 | (2019.01) |
| G06F 1/3234 | (2019.01) |
| G06F 9/30 | (2018.01) |
| G06F 9/50 | (2006.01) |
| G06N 3/08 | (2023.01) |

(52) U.S. Cl.
CPC .......... *G06F 1/3234* (2013.01); *G06F 9/3001* (2013.01); *G06F 9/30105* (2013.01); *G06F 9/5016* (2013.01); *G06N 3/08* (2013.01); *G06F 2209/5011* (2013.01)

(58) Field of Classification Search
CPC .. G06F 1/3234; G06F 9/3001; G06F 9/30105; G06F 9/5016; G06F 2209/5011; G06F 1/3275; G06N 3/08; Y02D 10/00
See application file for complete search history.

(56) References Cited

U.S. PATENT DOCUMENTS

| 10,956,584 B1 * | 3/2021 | Heaton | G06F 9/3802 |
| 11,561,833 B1 * | 1/2023 | Heaton | G06F 9/544 |
| 11,570,477 B2 * | 1/2023 | Xu | H04N 19/44 |
| 2018/0173571 A1 * | 6/2018 | Huang | G06F 9/5044 |
| 2018/0300138 A1 * | 10/2018 | Pineda de Gyvez | G06F 9/462 |
| 2019/0179870 A1 * | 6/2019 | Bannon | G06F 12/0875 |
| 2020/0110604 A1 * | 4/2020 | Lovell | G06N 3/045 |

* cited by examiner

*Primary Examiner* — Xuxing Chen
(74) *Attorney, Agent, or Firm* — North Weber & Baugh LLP; Michael North (57) ABSTRACT

In-flight operations in an inbound data path from a source memory to a convolution hardware circuit increase computational throughput when performing convolution calculations, such as pooling and element-wise operations. Various operations may be performed in-line within an outbound data path to a target memory. Advantageously, this drastically reduces extraneous memory access and associated read-write operations, thereby, significantly reducing overall power consumption in a computing system.

20 Claims, 7 Drawing Sheets

SYSTEMS AND METHODS FOR PERFORMING IN-FLIGHT COMPUTATIONS

BACKGROUND

A. Technical Field

The present disclosure relates generally to data processing. More particularly, the present disclosure relates to systems and methods for performing in-flight computations that improve utilization of computing and memory resources when performing arithmetic operations, such as convolutions and pooling operations.

B. Background

Some of the most exciting applications of machine learning use Convolutional Neural Networks (CNNs). CNNs apply a number of hierarchical network layers and sub-layers to, for example, an input image to determine whether to categorize an image as containing a person or some other object. CNNs use neural network-based image classifiers that can automatically learn complex features for classification and object recognition tasks. Arithmetic operations for convolutions are typically performed in software that operates on a general-purpose computing device, such as a conventional microprocessor. This approach is very costly in terms of both power and time, and for many computationally intensive applications (e.g., real-time applications) general hardware is unable to perform the necessary operations in a timely manner since the rate of calculations is limited by the computational resources and capabilities of existing hardware designs.

Further, using a general processor's arithmetic functions to generate intermediate results comes at the expense of computing time due to the added steps of storing and retrieving intermediate results from various memory locations to complete an operation. For example, many conventional multipliers are scalar machines that use a CPU or GPU as their computation unit and use registers and a cache to process data stored in memory relying on a series of software and hardware matrix manipulation steps, such as address generation, transpositions, bit-by-bit addition and shifting, converting multiplications into additions and outputting the result into some internal register.

Furthermore, computationally demanding applications involving convolutions oftentimes require a software function be embedded in the microprocessor and be used to convert convolution operations into alternate matrix-multiply operations. This involves rearranging and reformatting image data and weight data into two matrices that then are raw matrix-multiplied. Currently, there exist no mechanisms that efficiently access and process large amounts of data without generating redundant data or repeatedly storing and accessing data. Software must access the same locations of a standard memory and read, re-fetch, and write the same data over and over again when performing convolution operations, which is computationally demanding and creates a bottleneck for machine learning applications. As the amount of data subject to convolution operations increases and the complexity of operations continues to grow, the inability to reduce the steps of storing and retrieving intermediate results from memory to complete an arithmetic operation present only some of the shortcoming of existing designs. In short, conventional hardware and methods are not well-suited for the ever-increasing demands for speed, performance, and energy conservation that are required to perform a myriad of complex processing steps involving large amounts of data in real-time.

Accordingly, what is needed are systems and methods that increase computational throughput and reduce power consumption by reducing the number of extraneous memory access and read-write operations and data moves when making computations using CNNs and other neural networks.

BRIEF DESCRIPTION OF THE DRAWINGS

References will be made to embodiments of the disclosure, examples of which may be illustrated in the accompanying figures. These figures are intended to be illustrative, not limiting. Although the accompanying disclosure is generally described in the context of these embodiments, it should be understood that it is not intended to limit the scope of the disclosure to these particular embodiments. Items in the figures may be not to scale.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system/device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. The terms "include," "including," "comprise," and "comprising" shall be understood to be open terms and any lists the follow are examples and not meant to be limited to the listed items.

A service, function, or resource is not limited to a single service, function, or resource; usage of these terms may refer to a grouping of related services, functions, or resources, which may be distributed or aggregated. The use of memory, database, information base, data store, tables, hardware, and the like may be used herein to refer to system component or components into which information may be entered or otherwise recorded. The terms "data," "information," along with similar terms may be replaced by other terminologies referring to a group of bits, and may be used interchangeably. Any headings used herein are for organizational purposes only and shall not be used to limit the scope of the description or the claims. All documents cited herein are incorporated by reference herein in their entirety.

It is noted that although embodiments described herein are given in the context of CNNs, one skilled in the art will recognize that the teachings of the present disclosure are so not limited and may equally be applied to various other networks and contexts that involve arithmetic operations. Such arithmetic operations may comprise, e.g., pooling operations or element-wise operations. In this document, the term "element-wise operations" comprises operations that represent mathematical computations, such as additions, subtractions, multiplications, and logical operators, such as AND, OR, XOR, etc.

As used herein, the term "in-flight" refers to operations that are performed in an inbound data path, e.g., from a source memory to a hardware circuit that performs convolution operations. The terms "kernel," "parameter," and "weight" are used interchangeably according to their common meaning in the art of machine learning. "Neural network" includes any neural network known in the art.

Figure 1:
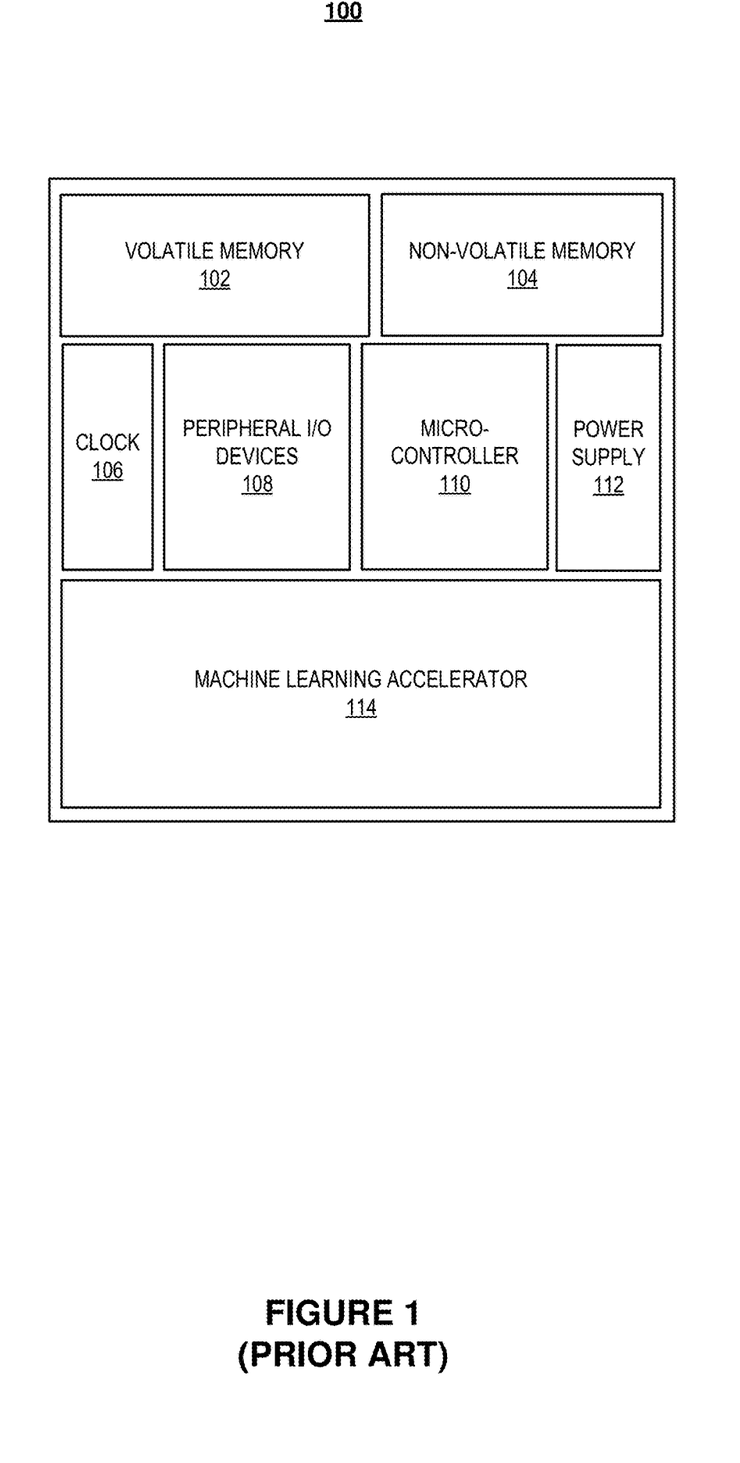
FIG. 1 is a general illustration of a typical machine learning accelerator system that processes data in multiple stages.

FIG. 1 illustrates a typical machine learning accelerator system that processes data in multiple stages. In some applications, the machine learning accelerator system may comprise an embedded machine learning accelerator system, for example, system 100 contains volatile memory 102, non-volatile memory 104, clock 106, clock I/O peripherals, microcontroller 110, power supply 112, and machine learning accelerator 114. Microcontroller 110 can be a traditional digital signal processor, machine learning accelerator 114 can be implemented as a CNN accelerator that comprises hundreds of registers (not shown). Machine learning accelerator 114, like any of the other components depicted in FIG. 1, interfaces with other parts of machine learning accelerator system 100.

In operation, microcontroller 110 optionally performs typical pre-processing steps. For example, in a preprocessing step in an audio application, microcontroller 110 can receive input data and apply to it a number of Fourier transformation operations to convert the data from a time domain to a frequency domain representation. The result of such conversion may then serve as an input for machine learning accelerator 114.

Machine learning accelerator 114 typically uses weight data to perform matrix-multiplications and related convolution computations on input data using weight data. The weight data may be unloaded from accelerator 114, for example, to load new or different weight data prior to accelerator 114 performing a new set of operations using the new set weight data. More commonly, the weight data remains unchanged, and for each new computation, new input data is loaded into accelerator 114 to perform the computations, e.g., as a sequence of layers, for example a pooling layer that is followed by a convolutional layer. Conventionally, this means that data is read from a source memory, pooled, written to a target memory, re-read from the memory, convolved, and written to a new target memory. This repeated memory read/write access in for several distinct and separate operations is illustrated in FIG. 2.

Figure 2:
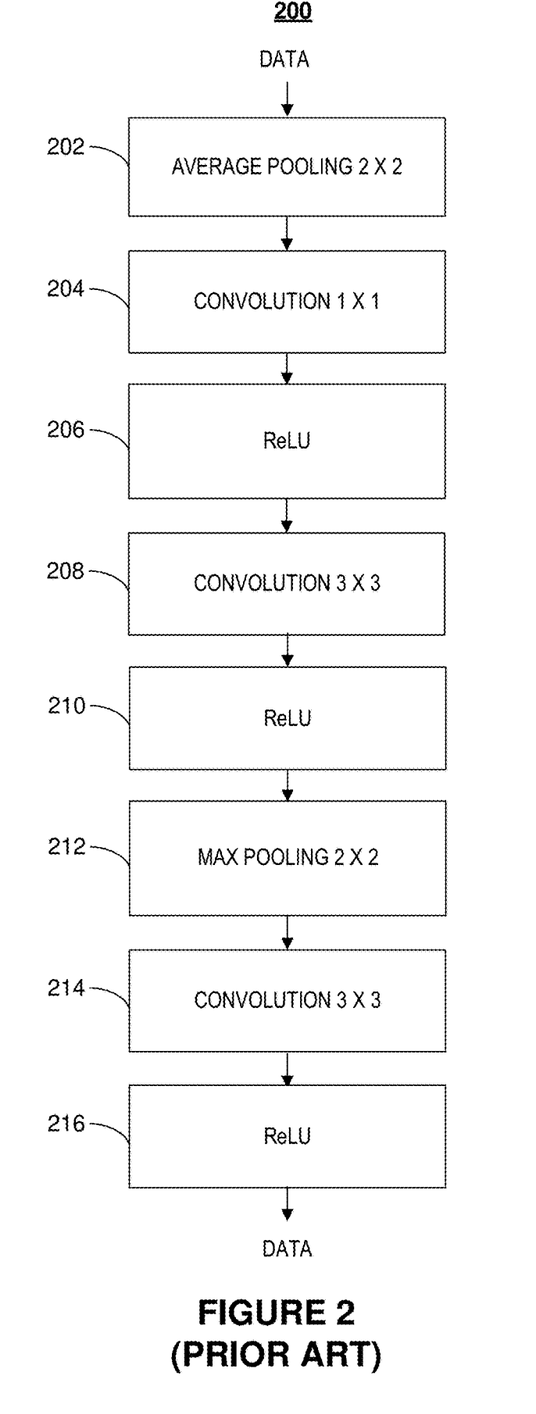
FIG. 2 illustrates common data processing stages as employed by the machine learning accelerator system shown in FIG. 1.

FIG. 2 shows common data processing stages as employed by the machine learning accelerator system shown in FIG. 1. Each arrow in FIG. 2 represents a pair of memory read/write accesses. As depicted, a pooling operation is followed by a convolution operation that is followed by a ReLU operation and another convolution operation, and so on. Conventional pooling is a form of nonlinear sub-sampling or down-sampling that uses a nonlinear function, such as max-pooling or average-pooling, to reduce the amount of computations and increase throughput. Pooling steps generally involve sliding a pooling window, e.g., a two-dimensional square-shaped window stepwise across small, overlapping or non-overlapping areas of an output of a preceding convolution. Aggregating the values of the group of data in the window provides single output values (e.g., integers) for each group in a local neighborhood.

In FIG. 2, each transition from one operation 202-216 to the next is associated with a pair of memory read/write accesses that require reading and writing from and to memory. In other words, once a result is written to memory is has be read back before a subsequent operation can be performed. Then, that result is written to memory, end so on. However, memory access and moving data is known to consume a relatively large amount of power. For an exemplary 3×3 convolution operation, a common accelerator (not shown in FIG. 2) has to fetch from memory 9×(channel weights) and 9×(pieces of data) for each input piece of data, multiplied by the number of input channels. In practice, such memory fetches and related moving steps are time and energy consuming, particularly for large input data, when compared to, e.g., moving one piece of data per channel, which would significantly reduce the number of memory fetches, e.g., by a factor proportional to the square root of the number of such conventional memory fetches.

Various embodiments herein reduce memory access and data movement are greatly desirable, e.g., by combining neural network processing steps in a manner such as to reduce the number of distinct layers that are otherwise being processed individually and separately.

Figure 3:
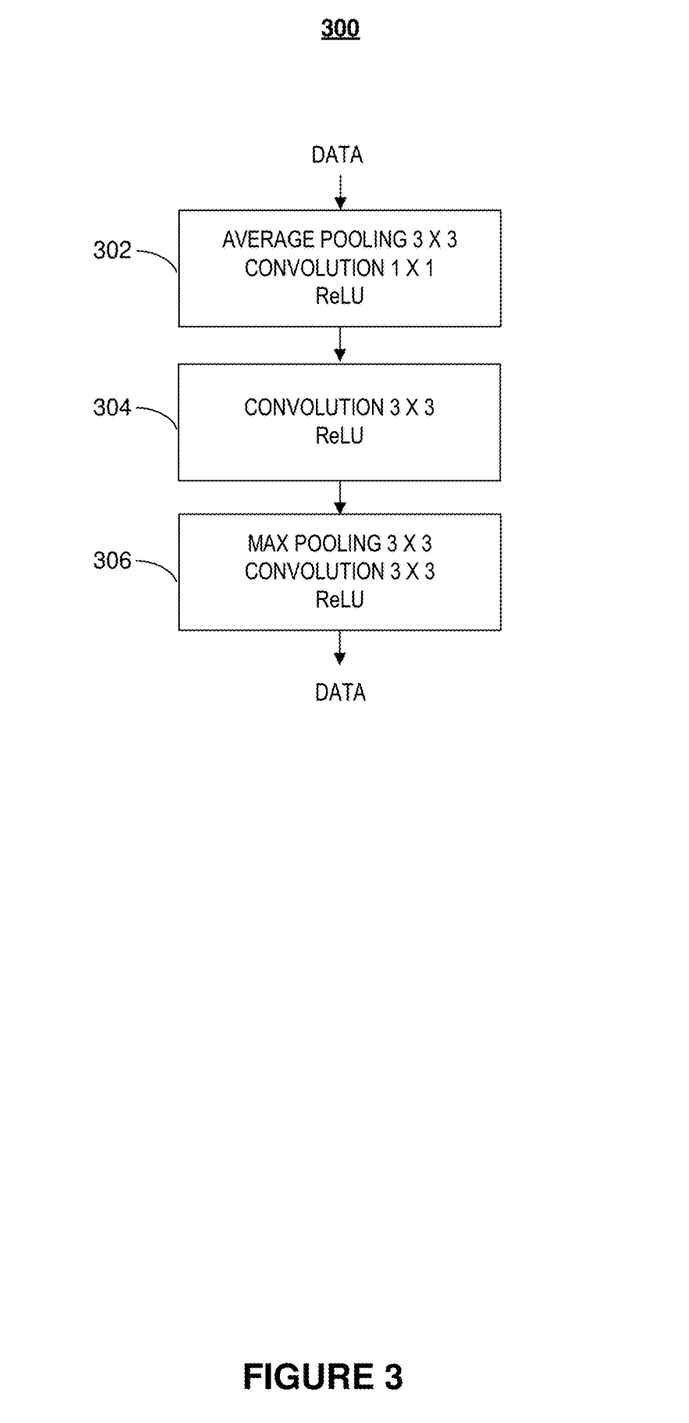
FIG. 3 illustrates a combination of data processing stages in a convolutional neural network, according to embodiments of the present disclosure.

FIG. 3 illustrates a combination of data processing stages in a convolutional neural network, according to embodiments of the present disclosure. As depicted in FIG. 3, at step 302, a 3×3 average pooling, a 1×1 convolution, and a ReLU step are processed concurrently or in parallel. Similarly, at step 306, a 3×3 max pooling, a 3×3 convolution, and a ReLU step are combined and processed together, thereby, reducing the number of steps from eight to three when compared to the traditional approach shown FIG. 2.

Combing data processing stages in this manner is especially useful in circumstances where, for example, accelerator capacity is limited to, e.g., 32 stages. In addition, it is obvious that when more layers are present in a network, the number of stages increases, and more data needs be to be processed. Further, the more data is to be processed, the more data will need to be moved. Thus, intuitively, energy savings obtained by reducing the number of layers that are otherwise individually processed will, advantageously, be proportional to the resulting energy savings to a first order degree.

Figure 4:
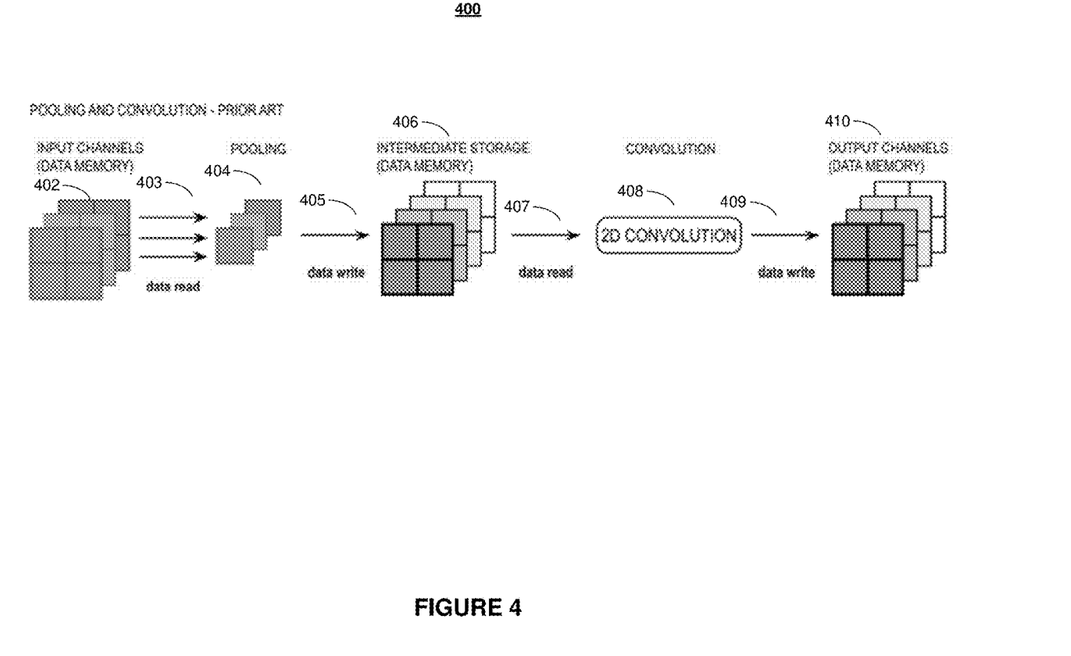
FIG. 4 shows a common data flow in a neural network when performing pooling and convolution operations using intermediate storage.

FIG. 4 shows a common data flow in a neural network when performing pooling and convolution operations using intermediate storage. As depicted in FIG. 4, data path (400) comprises input channel data (402) that may be stored in a source memory, e.g., a data memory device. The data is read (403) from the source memory before pooling operations (404) are performed, typically by a hardware accelerator (not shown). To accomplish pooling (404), typically, existing software approaches are used that operate on standard hardware and undergo a series of operations along data path (400), resulting in large power consumption. The results are then written (405) into intermediate storage device (406), e.g., also is a data memory device. Then, the data is read (407), for example, by a CPU that performs a two-dimensional convolution operation (408) and writes (409) the resulting output into a target memory (410), again, a data memory device.

It is note that the three different shades of grey depicted in FIG. 4 represent three different sets of the input data, e.g., RGB color information that may be associated with three distinct channels, which are initially stored in a data memory device. The mathematical concepts underlying neural networks are known in the art. In brief, a set of filters in the form of a limited-size weight data is applied to a set of larger input channel data (402) (e.g., passed across an area of an image) or image data to produce output channel data (e.g., an output matrix) for a particular layer of the neural network. Each element in each output channel (410) represents the sum of the products of the individual weights in the kernel multiplied by the individual data values of the input channels, passed through a nonlinear activation function, such as a ReLU or sigmoid function. It should be noted that the number of three channels depicted in FIG. 4 is used for convenience of illustration, and any number (from one to thousands or more) may be used in practice, and that therefore channels do not correspond to shades of grey in most cases.

As previously mentioned, conventional read/write steps associated with reading data from a source memory, using the read data in a computation, storing it, writing it back to data memory, and re-reading it from memory, before feeding it to a computational engine that computes and outputs a result, as well as related additional steps that cause the data to be moved around, are both time and energy consuming.

Figure 5:
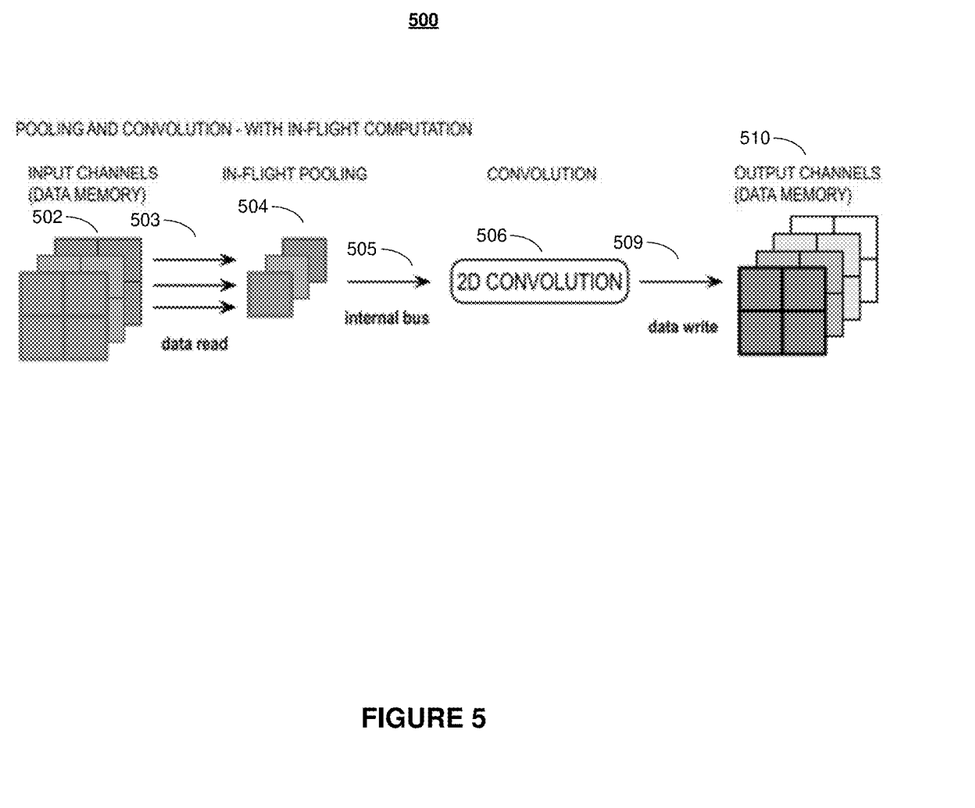
FIG. 5 illustrates data flow in a neural network for performing in-flight pooling and convolution operations without requiring intermediate storage, according to embodiments of the present disclosure.

In contrast, FIG. 5 illustrates data flow in a neural network for performing in-flight pooling and convolution operations without requiring intermediate storage, according to embodiments of the present disclosure. Similar to the data path in FIG. 4, data path (500) in FIG. 5 comprises input channel data (502) that may be stored in a source memory, e.g., a data memory device such as non-volatile memory or that may be streamed directly, e.g., from a sensor. However unlike the data path in FIG. 4, the data in FIG. 5 may be directly read (503), e.g., into a compute cache (not shown in FIG. 5) to perform in-flight pooling operations (504). In various embodiments, the results may be transferred, e.g., on an internal bus (505) directly to a hardware accelerator or similar compute engine that performs one or more convolution operations (506) on the in-flight pooling data. As in FIG. 4, the rest of data path (500) comprises writing (509) the resulting output into a target memory (510).

In various embodiments, in-flight pooling (504), comprises pooling operations that occur when the original data is read (502) out from a source memory before the pooled data are written into a compute cache. For example, data in a pooling window may be max-pooled by streaming the data element-by-element and replacing one element value with the value of a subsequent element in the data stream if the subsequent value is a greater (and otherwise ignoring it). In this manner, the pooling operation does not rely on intermediate storage or caching steps.

In embodiments, in-flight pooling (504), comprises operations, such as pooling or element-wise operations that precede a convolution operation, such as a one-dimensional or multi-dimensional convolution operation. However, this is not intended as a limitation on the scope of the present disclosure since no pooling or element-wise operation is required, and data (502) that has been fetched from memory may directly be used to perform the convolution operation (506). Conversely, certain operations may be split into two or more steps that are, e.g., consecutively performed once the data is fetched form the source.

In embodiments, in-flight pooling (504) may be implemented in hardware to eliminate unnecessary data movement to reduce computing time and power consumption. It is noted that any portion of in-flight pooling (504) computations may be performed in parallel, e.g., by using a number of pooling engines, e.g., engines that themselves may perform series operations. It is further noted that embodiments herein are not limited to any particular kernel size, filter size, or pooling type, and may apply to other computations that may operate on input depth slices independently.

In embodiments, several in-flight operations (504) and convolution operations (506) may be performed concurrently, thereby, saving at least one write and one read cycle. The output of the data that has been already read (503) may be directly piped to and used in a computation. Certain neural network operations, whether element-wise operations or pooling that may operate locally and on a single channel without crossing depths, i.e., mixing input channels and output channels, may take advantage of reducing computationally expensive data movement operations. Advantageously, not having to write back results into memory drastically reduces power consumption. An exemplary pooling operation comprises reading four neighboring pixels to generate an output (504) that may be directly used in convolutional neural network calculation (506) to output a convolution result without writing the result to memory, i.e., without having to store intermediate results and without additional memory access to perform energy-inefficient read and write operations. It is understood that such pooling operations equally apply to multiple inputs.

In embodiments, other or additional operations may be combined. For example, a difference operation, e.g., between two input pictures, may be combined with a convolution operation, rather than subtracting the two pictures, writing the result into memory, and then reading out the result from that memory to perform any number of convolution operations. Stated differently, once the data is fetched from the source memory, a subtraction and convolution operation may be performed together. Other exemplary operations that may be located in data path 500 and may be used in a combined operation comprise XOR operations, multiplications, and the like. Advantageously, performing one or more operations on read data (503) may reduce a number of layers that is processed in a neural network.

In embodiments, input data that has been fetched or read (503) from data memory may be loaded into a cache or memory in a certain format to enable in-flight pooling (504). For example, a circuit, such as a logic circuit that may be located within the cache or memory may be used to process a portion of the input data that corresponds to a set of neighboring data elements in a matrix by sequentially comparing a value of one data element to all its neighbors to obtain a pooling result. The pooling result may be written into a compute cache that may be used to perform a convolution without having to write back the results into a memory device. This reduces power consumption since data is read once, and optionally processed, e.g., by performing a pooling operation on the data, and the output of that pooling operation (or the read data) may then be transferred directly into a convolutional accelerator.

In embodiments, a convolutional accelerator may comprise a register-based hardware structure or cache that lends itself to accepting a new element or item, for example, each time one element is fetched, processed, and outputted. An exemplary cache structure is described in U.S. patent application Ser. No. 16/590,258, entitled, "Energy-Efficient Tornado Memory Systems and Methods," filed on Oct. 1, 2019, and listing as inventors Mark Alan Lovell and Robert Michael Muchsel, which patent document is incorporated by reference herein in its entirety for all purposes. It is noted that a suitable cache structure need not operate on input data read (503) from source memory. Instead, the cache structure may operate on data that has been modified, here, e.g., by a pooling or element-wise operation (504).

It is understood that, in embodiments, in data path (500) between reading (503) data from memory and providing it to a hardware accelerator to that performs convolutions (506) other or additional steps may be performed on the input side. Conversely, on the output side, prior to writing (409) the result of convolution (506) to memory (410), the output data may be manipulated, e.g., by performing a shifting, ReLU, multiplication, or any other operation that fall within the scope of the present disclosure.

As those skilled in the art will appreciate, suitable implementation-specific modifications may be made, e.g., to adjust for the dimensions and shapes of the input data. The relatively small and square input data and kernel sizes, their aspect ratios, their orientations, and channel counts have been chosen for convenience of illustration and are not intended as a limitation on the scope of the present disclosure.

Figure 6:
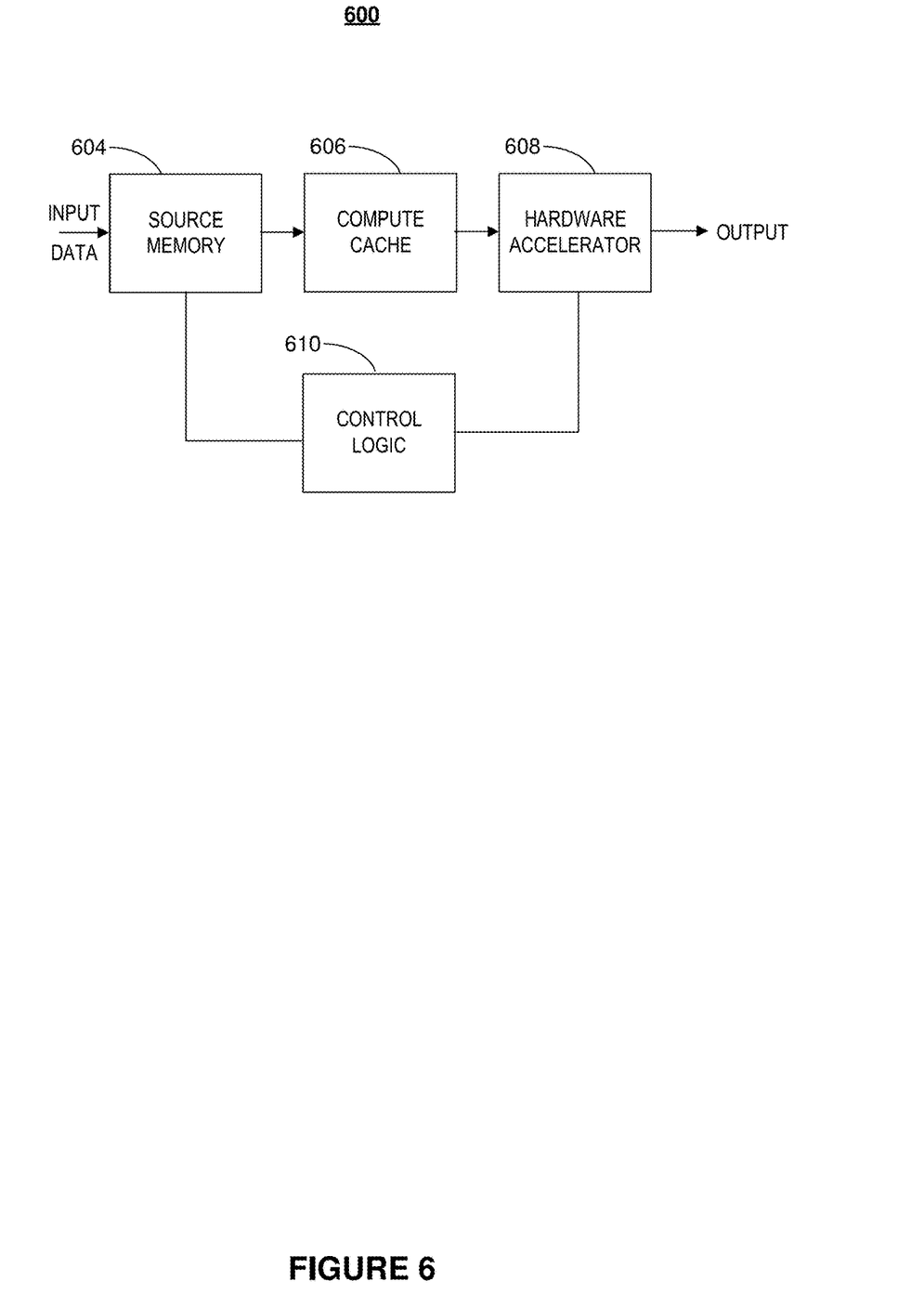
FIG. 6 illustrates an exemplary system for reducing power consumption in machine learning hardware accelerators according to various embodiments of the present disclosure.

FIG. 6 illustrates an exemplary system for reducing power consumption in machine learning hardware accelerators according to various embodiments of the present disclosure. System 600 comprises source memory 604, compute cache 606, hardware accelerator 608, and control logic 610. In embodiments, compute cache 606 may comprise at least one of a read access memory cell structure, a register-based hardware structure, or a logic circuit. In embodiments, compute cache 606 may be dimensioned based on memory 604.

In operation, once a set of input data is loaded into compute cache 606, compute cache 606 may be used to perform any number of arithmetic calculations on the input data to obtain a result. For example, convolution calculations may be performed simultaneously for all three channels shown in FIG. 5 to generate data for three output channels. In embodiments, the data in compute cache 606 may be simultaneously accessed and processed in a predetermined order to perform, for an input channel, a number of multiplication operations on one or more weight parameters. For example, a dot product that represents an output pixel of an image may be generated by performing a dot-multiplication using the weight parameters to obtain partial results that may then be added to obtain an aggregated dot product.

As a person of skill in the art will appreciate, the same weights may be reused to generate output data for different input data. It is noted that system 600 in FIG. 6 is not limited to the constructional detail shown there or described in the accompanying text. For example, in embodiments, compute cache 606 may be implemented in hardware accelerator 608 or in source memory 604, e.g., hard-wired in source memory 604, such that source data may be processed "in place."

In embodiments, hardware accelerator 608 may access parameters, such as weights that may have been learned by the neural network during a training phase and use those weights, for example, to generate an activation value. For each convolution window, the activation value may identify a feature or a characteristic, such as, for example, an edge that then may be used to identify the same feature at other locations within an image associated with input channel data (502).

Figure 7:
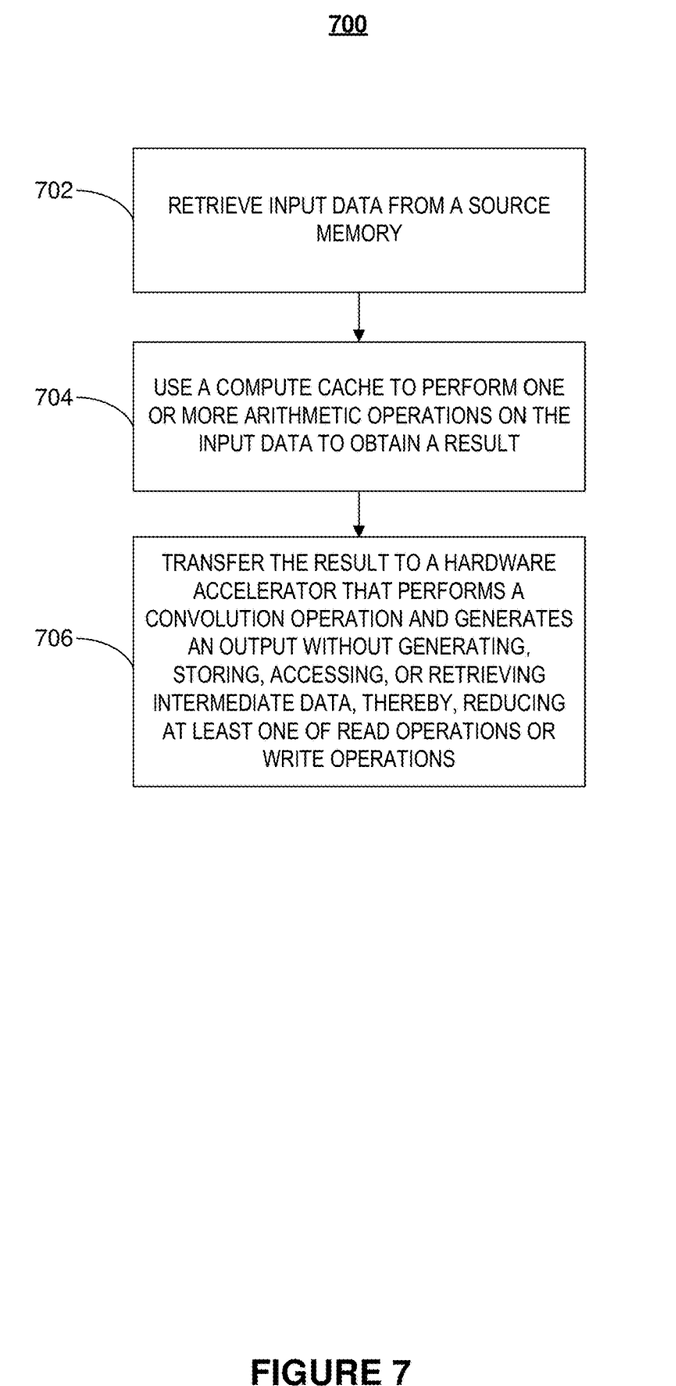
FIG. 7 is a flowchart of an illustrative process for reducing power consumption in machine learning hardware accelerators according to various embodiments of the present disclosure.

It is understood that system 600 may comprise any number of additional circuits and sub-circuits, such as logic circuitry and/or control circuits, caches, local buffers, comparators, state machines, post-processing units, and auxiliary devices that perform management functions to aid the goals of the present disclosure FIG. 7 is a flowchart of an illustrative process for reducing power consumption in machine learning hardware accelerators according to various embodiments of the present disclosure. In embodiments, process 700 may start when, at step 702, input data is retrieved from a source memory. At step 704, a compute cache may be used to perform one or more arithmetic operations on the input data to obtain a result. At step 706, the result may be transferred to a hardware accelerator that performs a convolution operation and generates an output. In embodiments, the hardware accelerator does to without generating, storing, accessing, or retrieving intermediate data, thereby, reducing at least one of read operations or write operations. It shall be noted that: (1) certain steps may optionally be performed; (2) steps may not be limited to the specific order set forth herein; (3) certain steps may be performed in different orders; and (4) certain steps may be done concurrently.

One skilled in the art will recognize no computing system or programming language is critical to the practice of the present invention. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A method for reducing power consumption in machine learning hardware accelerators, the method comprising:
   retrieving input data from a source memory;
   using a compute cache to perform one or more arithmetic operations on the input data to obtain a result; and
   transferring the result to a hardware accelerator that performs a convolution operation and generates an output without generating, storing, accessing, or retrieving intermediate data, thereby, reducing at least one of read operations or write operations, wherein the hardware accelerator is a separate circuit from the compute cache.

2. The method according to claim 1, wherein the compute cache comprises a read access memory cell structure, a register-based hardware structure, or a logic circuit.

3. The method according to claim 1, wherein the compute cache comprises a register-based hardware structure.

4. The method according to claim 1, wherein performing the one or more arithmetic operations on the input data reduces a number of layers processed in a neural network.

5. The method according to claim 1, wherein the one or more arithmetic operations comprise a pooling operation.

6. The method according to claim 1, wherein the one or more arithmetic operations comprise an element-wise operation.

7. The method according to claim 1, wherein loading the input data from the source memory into the compute cache comprises reusing data.

8. The method according to claim 1, wherein at least one of the source memory or the data memory are an independent memory device.

9. The method according to claim 1, wherein the compute cache comprises a set of neighboring data elements.

10. A system for reducing power consumption in machine learning hardware accelerators, the system comprising:
    a source memory configured to store input data;
    a compute cache coupled to the source memory, the compute cache retrieves the input data from the source memory and performs one or more arithmetic operations on the input data to obtain a result; and
    a hardware accelerator that is a separate circuit from the compute cache, the hardware accelerator being coupled to the compute cache and to a data memory, in response to receiving the result, performs steps comprising:
       performing a convolution operation;
       based on the convolution operation, generating an output without generating, storing, accessing, or retrieving intermediate data to reduce at least one of read operations or write operations; and
       writing the output to the data memory.

11. The system according to claim 10, wherein the compute cache is integrated into the source memory or the hardware accelerator.

12. The system according to claim 10, wherein the compute cache is implemented as a read access memory cell structure.

13. The system according to claim 10, wherein the compute cache is implemented as a register-based hardware structure.

14. The system according to claim 10, wherein the compute cache comprises a logic circuit.

15. The system according to claim 10, wherein performing the one or more arithmetic operations on the input data reduces a number of layers processed in a neural network.

16. The system according to claim 10, wherein the one or more arithmetic operations comprise at least one of a pooling operation or an element-wise operation.

17. The system according to claim 10, wherein the convolution operation comprises a multiplication.

18. The system according to claim 10, wherein loading the input data from the source memory into the compute cache comprises reusing data.

19. The system according to claim 10, wherein at least one of the source memory or the data memory are an independent memory device.

20. The system according to claim 10, wherein the compute cache comprises a set of neighboring data elements.

* * * * *